(12) United States Patent
Kim

(10) Patent No.: US 7,362,944 B2
(45) Date of Patent: Apr. 22, 2008

(54) COMBINATION SYSTEM USING SET-UP VALUE COMMONLY, AND METHOD FOR SETTING UP VALUE OF THE SAME

(75) Inventor: Yong-ho Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1177 days.

(21) Appl. No.: 10/105,217

(22) Filed: Mar. 26, 2002

(65) Prior Publication Data

US 2002/0168172 A1 Nov. 14, 2002

(30) Foreign Application Priority Data

May 10, 2001 (KR) ................................ 2001-25530

(51) Int. Cl.
*H04N 5/91* (2006.01)
*G06F 3/00* (2006.01)
*G06F 3/48* (2006.01)
*G06F 13/00* (2006.01)

(52) U.S. Cl. ............................. 386/46; 386/66; 386/83; 386/94; 715/723; 715/841; 725/37

(58) Field of Classification Search ................. 386/46, 386/66, 83, 94; 715/810, 841; 345/352, 345/353; 347/723; 725/37
See application file for complete search history.

(56) References Cited

U.S. PATENT DOCUMENTS 5,623,572 A 4/1997 Kim

| | | | |
|---|---|---|---|
| 6,091,884 A * | 7/2000 | Yuen et al. ..................... 386/83 |
| 6,204,885 B1 * | 3/2001 | Kwoh .......................... 348/564 |
| 6,429,879 B1 * | 8/2002 | Sturgeon et al. ............. 715/723 |
| 2002/0101514 A1 * | 8/2002 | Watanabe .................... 348/211 |
| 2003/0206711 A1 * | 11/2003 | Berkheimer et al. .......... 386/46 |

FOREIGN PATENT DOCUMENTS

WO 01/96983 12/2001

OTHER PUBLICATIONS

European Search Report dated Feb. 1, 2007.

* cited by examiner

*Primary Examiner*—Thai Tran
*Assistant Examiner*—Syed Y. Hasan
(74) *Attorney, Agent, or Firm*—Staas & Halsey LLP

(57) ABSTRACT

A combination system commonly using a set-up value with regard to plural devices. The combination system has an input unit to input the set-up value, plural set-up value storage units to store the input set-up value, and a controller to control a set-up value storage operation with respect to the set-up value storage units. A user inputs the set-up value as data about an operation mode of each of the devices through the input unit. The controller judges whether the set-up value input into one of the devices is the same type value as a pre-set up value with regard to another device. When the set-up value is determined to be the same type value, then the controller sets up the pre-set up value as a common set-up value with regard to the plural devices. Accordingly, the user does not have to input the set-up value individually for each of the devices.

24 Claims, 11 Drawing Sheets

FIG. 6

Choosing Your Language

*You can change the language in which information is displayed on the screen.*

1. Press SETUP on the remote control.
   Result: The programming menu is displayed.

2. Press the corresponding ▲, ▼ or ◄, ► buttons to select the LANGUAGE SET option.

3. Press the ENTER button to select this option.
   Result: The LANGUAGE SET menu is displayed.

4. Select the required language by pressing the ▲ or ▼ buttons.

5. Press ENTER to store the language selected.

6. Press SETUP to exit the menu.
   Result: From now on, all the on-screen information will be displayed in the language selected.

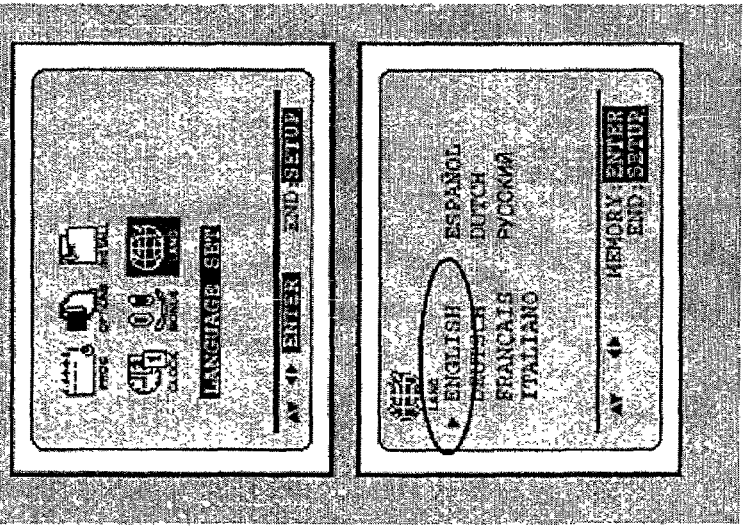

FIG. 9

Using the Subtitle Language

1. With no disc playing, press the SETUP button.

2. Use the ▲, ▼ button to select SUBTITLE.

3. Press the ENTER button.

4. Use the ▲, ▼ button to select 'ENGLISH'.
   - Select "AUTOMATIC" if you want the subtitle language to be the same as the language selected as the audio preference.
   - Select "OTHERS" if the language you want is not listed. Some discs may not contain the language you select as your initial language; in that case the disc will use its original language setting.

5. Press the ENTER button.
   - ENGLISH is selected and the screen returns to SETUP MENU.

♦ If the selected language is not recorded on the disc, the original pre-recorded language is selected.

♦ How to make the SETUP MENU disappear or return to menu screen during set up; Press RETURN button.

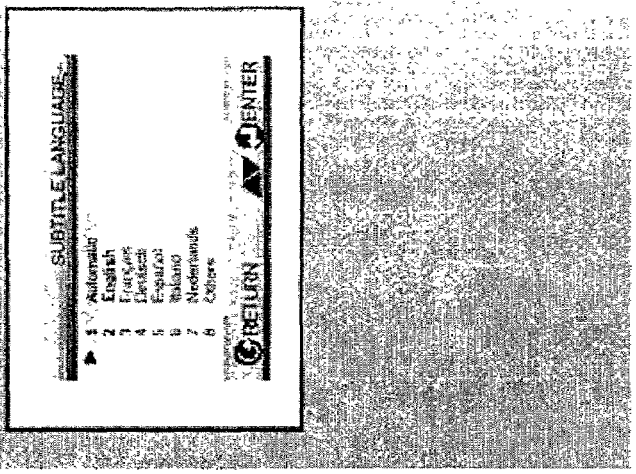

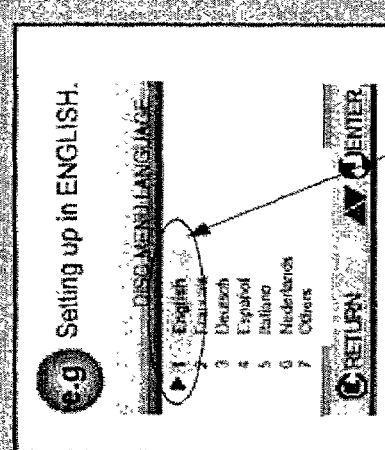

COMBINATION SYSTEM USING SET-UP VALUE COMMONLY, AND METHOD FOR SETTING UP VALUE OF THE SAME

CROSS-REFERENCE TO RELATED APPLICATIONS

This application claims the benefit of Korean Patent Application No. 2001-25530 filed on May 30, 2001, in the Korean Industrial Property Office, the disclosure of which is incorporated herein by reference.

BACKGROUND OF THE INVENTION

1. Field of the Invention

The present invention relates to a combination system, and more particularly, to a combination system in which a plurality of devices such as a DVDP and VCR to perform independent functions are combined as one system.

2. Description of the Related Art

A system in which two different apparatuses are combined as one integrated system is referred to as a 'combination system,' or a 'combo-system.' It may also be referred to as a 'combo.' One example of the combo-system is a DVDP/VCR combo-system developed to comprehensibly perform the function of a DVDP and a VCR.

FIG. 1 is a view schematically illustrating the DVDP/VCR combo-system and peripheral apparatuses connected to the DVDP/VCR combo-system. The DVDP/VCR combo-system 10 has a VCR unit 11 having a general function of a VCR, such as recording a signal transmitted from outside on a magnetic tape and reproducing an image and a sound recorded on the magnetic tape, and a DVDP unit 12 having a general function of a DVD player, such as reproducing the image and the sound recorded on a DVD (digital video disk). The DVDP/VCR combo-system 10 has an advantage of not only having an independent operation of the VCR unit 11 and the DVDP unit 12 but also performing a comprehensive operation of recording the image and the sound reproduced at the DVDP unit 12 on the magnetic tape at the VCR unit 11.

A TV set 23 used as a peripheral device to output the image and the sound reproduced from the DVDP unit 12 and the VCR unit 11 is connected with the DVDP/VCR combo-system. Moreover, an audio amp 21 used as another peripheral device to output the sound reproduced from the DVDP unit 12 is connected with the DVDP/VCR combo-system 10. Furthermore, an external apparatus 25, like a camcorder, can be connected with the DVDP/VCR combo-system 10. The DVDP/VCR combo-system 10 receives the transmitted image and the sound from the external apparatus 25 and records and/or reproduces the image and the sound.

The VCR unit 11 and the DVDP unit 12 in the DVDP/VCR combo-system 10 are manufactured as one system. Therefore, a user can manipulate mode conversion between the VCR unit 11 and the DVDP unit 12 and individual operations of the VCR unit 11 and the DVDP unit 12 by using a separate input device, like a remote controller 15 or a manipulation panel (not shown) disposed on a front side of the DVDP/VCR combo-system 10.

The combo-system 10 has an advantage that allows the user to enjoy various operations in one system without having both devices 11 and 12 provided as separate units. However, the user must separately set up set-up value data such as mode set-up data required for a proper operation of the devices 11 and 12, frequently causing an inconvenience to the user.

In other words, the user must input data in order to operate the DVDP unit 12 properly. The data is about a type of a language to be reproduced or the set-up value, such as a password, to prevent reproducing a certain program. To input the set-up value, the user must perform several operations, such as selecting a special language in a selection menu provided on a screen on the TV 23 through an OSD (On-screen Display) operation. In the conventional combo-system 10, the user must repeat the set-up value input operation with regard to the DVDP 12 and the VCR unit 11 respectively.

SUMMARY OF THE INVENTION

Accordingly, it is an object of the present invention to provide a combination system and a method of setting up a value of a combination system such that a user does not have to input set-up values one by one with respect to each of plural devices within the combination system.

Additional objects and advantages of the invention will be set forth in part in the description which follows and, in part, will be obvious from the description, or may be learned by practice of the invention.

The foregoing and other objects of the present invention are achieved by providing a combination system having an input unit to input a set-up value representing data about an operation mode of a plurality of devices within the combination system. Also provided is a plurality of set-up value storage units disposed in each of the plurality of devices. The set-up value storage units store data about the set-up value. Additionally, the combination system has a controller to control the set-up value storage units so that an existing set-up value stored in one of the set-up value storage units is stored in another of the set-up value storage units other than the one of the storage units when data input to the another of the set-up value storage units through the input unit is a same type of data as the existing set-up value stored in the one of the set-up value storage units.

An embodiment of the present invention provides that the controller controls the set-up value storage units so that the existing set-up value is stored in the another of the set-up value storage units when a command for common use of the set-up value is input through the input unit.

According to another embodiment of the present invention, the combination system comprises a plurality of set-up value storage units disposed in each of the devices. The set-up value storage units store data about the set-up value of each of the devices. The combination system further comprises a controller to control each of the set-up value storage units to store a set-up value pre-stored in one of the set-up value storage units into another of the set-up value storage units.

According to yet another embodiment of the present invention, the combination system comprises: a plurality of devices to perform independent operations; an input unit to input a set-up value with regard to the plurality of devices; and a set-up value storage unit to store the set-up value input through the input unit. Here, each of the devices commonly has the set-up value stored in the set-up value storage unit, and performs individual operations thereof based on the set-up value.

According to yet another embodiment of the present invention, a set-up value setting method comprises: judging whether a set-up value input into at least one of the plurality of devices is a same type of value as a pre-stored set-up value with regard to another device among the plurality of devices; and setting up the pre-stored set-up value as a common set-up value of the plurality of devices when the input set-up value and the pre-stored set-up value are judged to be the same type value in the judging operation.

According to the present invention, since each device commonly uses a set-up value that a user inputs, the user does not have to input the set-up values individually.

BRIEF DESCRIPTION OF THE DRAWINGS

These and other objects and advantages of the present invention will become apparent and more readily appreciated from the following description of the embodiments, taken in conjunction with the accompanying drawings of which:

FIG. 6 is a view illustrating one example of an OSD screen to set up a language for a combination system according to an embodiment of the present invention;

FIGS. 7 through 10 are views illustrating examples of the OSD screen when a set up language is used in a DVDP unit according to an embodiment of the present invention.

DETAILED DESCRIPTION OF THE PREFERRED EMBODIMENTS

Figure 1:
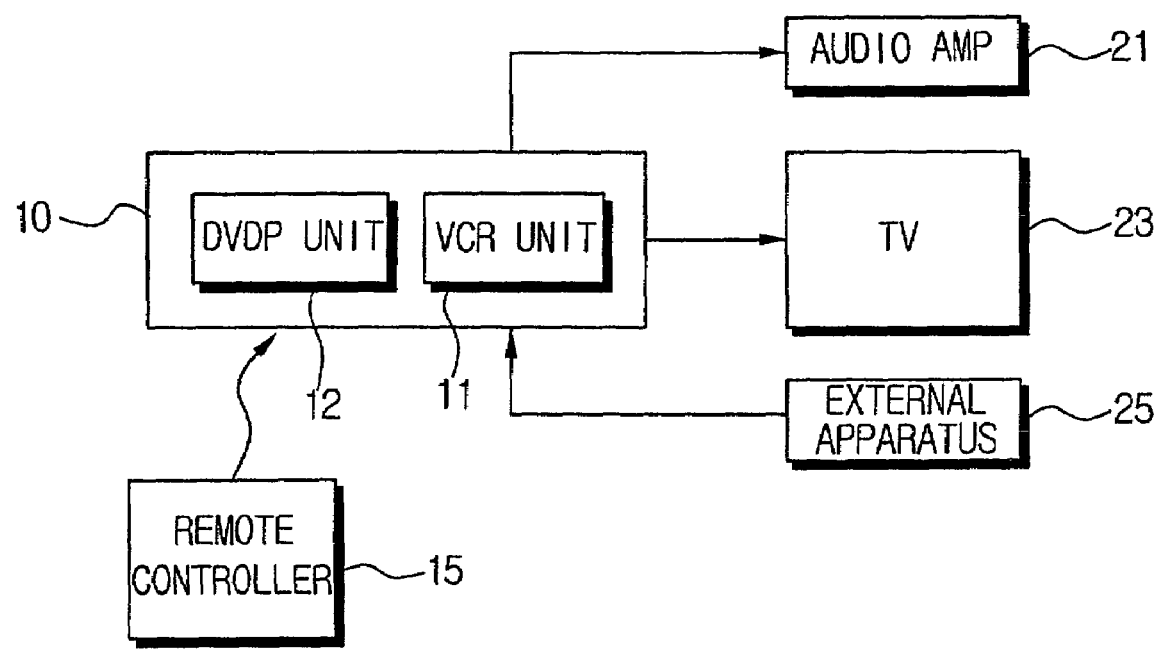
FIG. 1 is a schematic block diagram of a conventional DVDP/VCR combination system.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
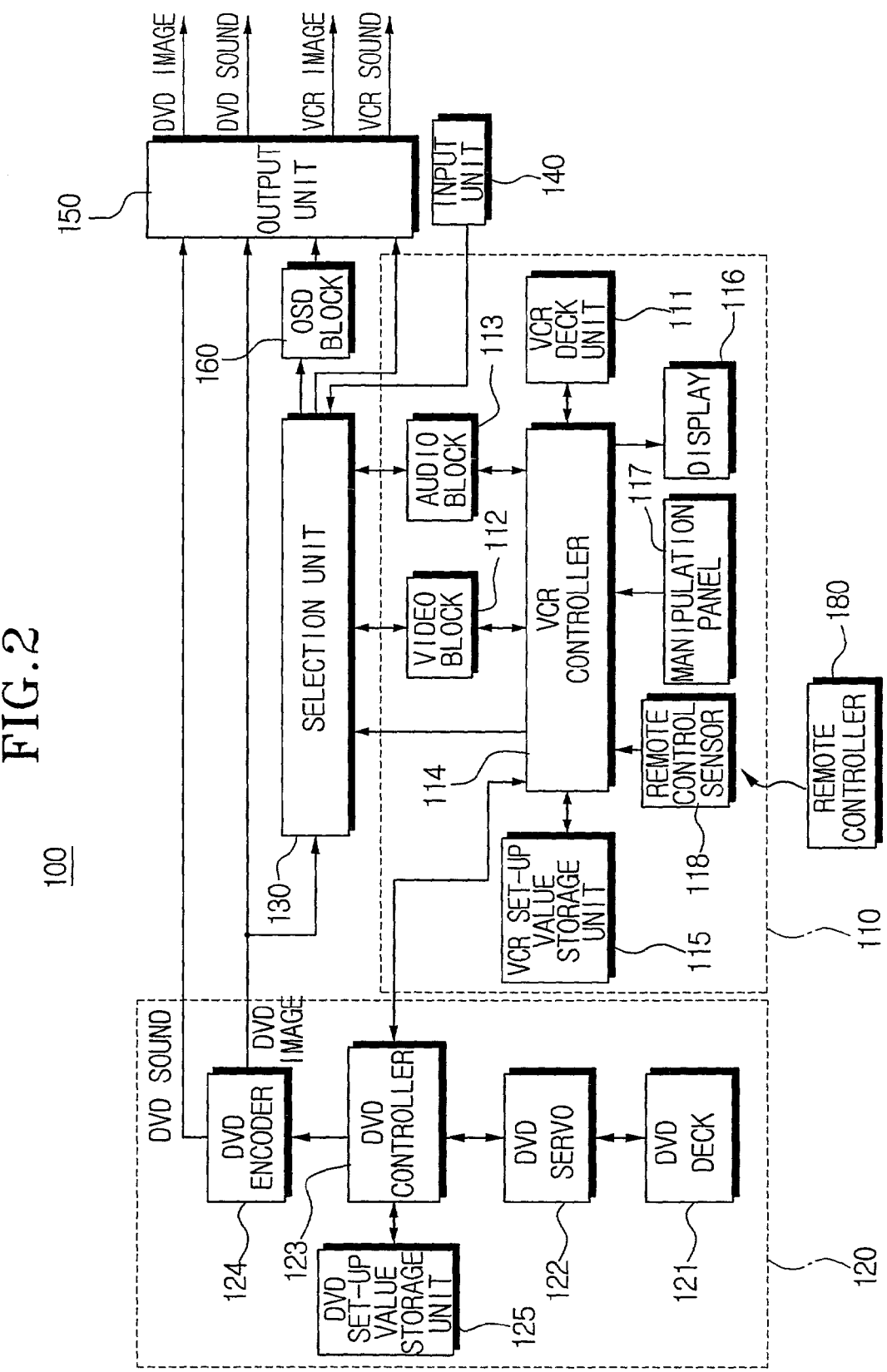
FIG. 2 is a block diagram of a DVDP/VCR combination system according to an embodiment of the present invention.

FIG. 2 is a block diagram illustrating an inner construction of a DVDP/VCR combo-system 100 according to an embodiment of the present invention capable of performing operations of a DVDP and a VCR.

The DVDP/VCR combo system 100 comprises: a VCR unit 110 to perform a general operation of a VCR; a DVDP unit 120 to perform a general of a DVDP; a selection unit 130 to perform a selection operation with respect to signals output from the VCR unit 110 and the DVDP unit 120; an input unit 140 to provide signals input from an external apparatus such as a camcorder to the selection unit 130; an output unit 150 to provide the signals output from the DVDP unit 120 and the VCR unit 110 to peripheral devices such as a TV or an amp; and an OSD block 160 to add an OSD operation to the image signal output from the VCR unit 110 and the DVDP unit 120.

The VCR unit 110 comprises: a VCR deck 111 to record signals on a magnetic tape or to reproduce the signals recorded on the magnetic tape; a video block 112 and an audio block 113 to transmit video signals or audio signals to be recorded or reproduced with respect to the VCR deck 111; and a VCR controller 114 to control general operations of the VCR deck 111, the video block 112 and the audio block 113. Moreover, the VCR unit 110 further comprises: a display 116 to display an operation, a control and a mode of the VCR unit 110 so that a user can know the status of the VCR unit 110; a manipulation panel 117 to receive various commands from the user; and a remote control sensor 118 to input the various commands through a remote controller 180 from the user.

Furthermore, the VCR unit 110 has a VCR set-up value storage unit 115 to store set-up values. The VCR set-up value storage unit 115 stores the set-up values required for operations of the VCR unit 110, such as a language and a password set up by the user. The VCR set-up value storage unit 115 can be constructed with a general memory. The VCR set-up value storage unit 115 can exist within the VCR or outside of the VCR as a separate memory. Moreover, an embodiment of the present invention provides that a non-volatile memory which does not lose stored data even though a power supply is turned off is used.

The storage and retrieval of the data with respect to the VCR set-up value storage unit 115 are performed by the VCR controller 114. The set-up value data that the user inputs by manipulating the remote controller 180 or the manipulation panel 117 is input into the VCR controller 114. Then the VCR controller 114 stores the data in the VCR set-up value storage unit 115. In addition, the VCR controller 114 controls each part in the VCR unit 110 based on the set-up value stored in the VCR set-up storage unit 115 when the VCR unit 110 is operated. For example, when language set up in the VCR set-up value storage unit 115 is in English, language of the OSD data is set up in English and then the language on the OSD screen is displayed in English.

The DVDP unit 120 has a DVD deck 121, a DVD servo 122, a DVD controller 123, and a DVD encoder 124. The DVD deck 121 reads the data recorded on the DVD so as to perform a reproducing operation with regard to the DVD. The DVD servo 122 controls a position and a speed of the DVD deck 121. The DVD encoder 124 outputs a DVD image data and a DVD sound data by receiving the data that the DVD deck 121 has read through the DVD controller 123. The DVD controller 123 controls an entire operation of the DVD deck 121, the DVD servo 122, and the DVD encoder 124.

Furthermore, the DVDP unit 120 has a DVD set-up value storage unit 125 to store set-up values. The DVD set-up value storage unit 125 stores the set-up values such as the language and the password set up by the user required for the operation of the DVD unit 120 as in the above mentioned VCR set-up value storage unit 115. The DVD set-up value storage unit 125 also can exist within the DVD controller 123 or outside of the DVD controller 123 as a separate memory. Moreover, the DVD set-up value storage unit 125 can be constructed with a usual memory or a non-volatile memory.

The storage and the retrieval of the data with respect to the DVD set-up value storage unit 125 is performed by the DVD controller 123, and the detailed operation is the same as the above mentioned operation of the VCR controller 114. Yet, it is shown that units such as the remote control sensor 118 and the manipulation panel 117 to input the data only exist in the VCR unit 110 in FIG. 2. Therefore, when the user inputs the data to be stored in the DVD set-up value storage unit 125, the data is transmitted to the DVD controller 123 by the VCR controller 114. Then, the transmitted data is input into the DVD set-up value storage unit 125 by the DVD controller 123.

Furthermore, as described later in more detail, the DVD controller 123 and the VCR controller 114 reciprocally transmit the set-up value data so that the DVD unit 120 and the VCR unit 110 can commonly use the set-up value input by the user.

An output of the DVD encoder 124 and an output of the video block 112 and the audio block 113, and the signal from the input unit 140 is input into the selection unit 130. The selection unit 130 operates a selection with regard to the signals input after being controlled by the VCR controller 114 and the DVD controller 123. The output of the selection unit 130 is input into the OSD block 160 and the output unit 150.

The OSD block 160 adds the OSD operation to the signal input from the selection unit 130. Therefore, an image to be added to the image output on the TV screen is created by the OSD block 160 as the menu to control the operation of the DVDP unit 120 and the VCR unit 110 and the menu to set up the set-up value.

The output unit 150 outputs the signals related to the DVD image, the DVD sound, the VCR image, and the VCR sound by receiving the signals from the DVD encoder 124, the selection unit 130, and the OSD block 160. Peripheral devices such as the TV or the amp are connected with the output unit 150, and thus the image and the sound is output from the peripheral devices.

The input unit 140 is connected with the selection unit 130 and performs an operation of transmitting the signal input from the outside to the selection unit 130. An output terminal of the external apparatus such as the camcorder is connected with the input unit 140. Therefore, the signal recorded in the external apparatus can be transmitted to the combo-system 100 through the input unit 140. Moreover, the signal can be recorded on the magnetic tape using the VCR unit 110 or reproduced through the TV.

Figure 3:
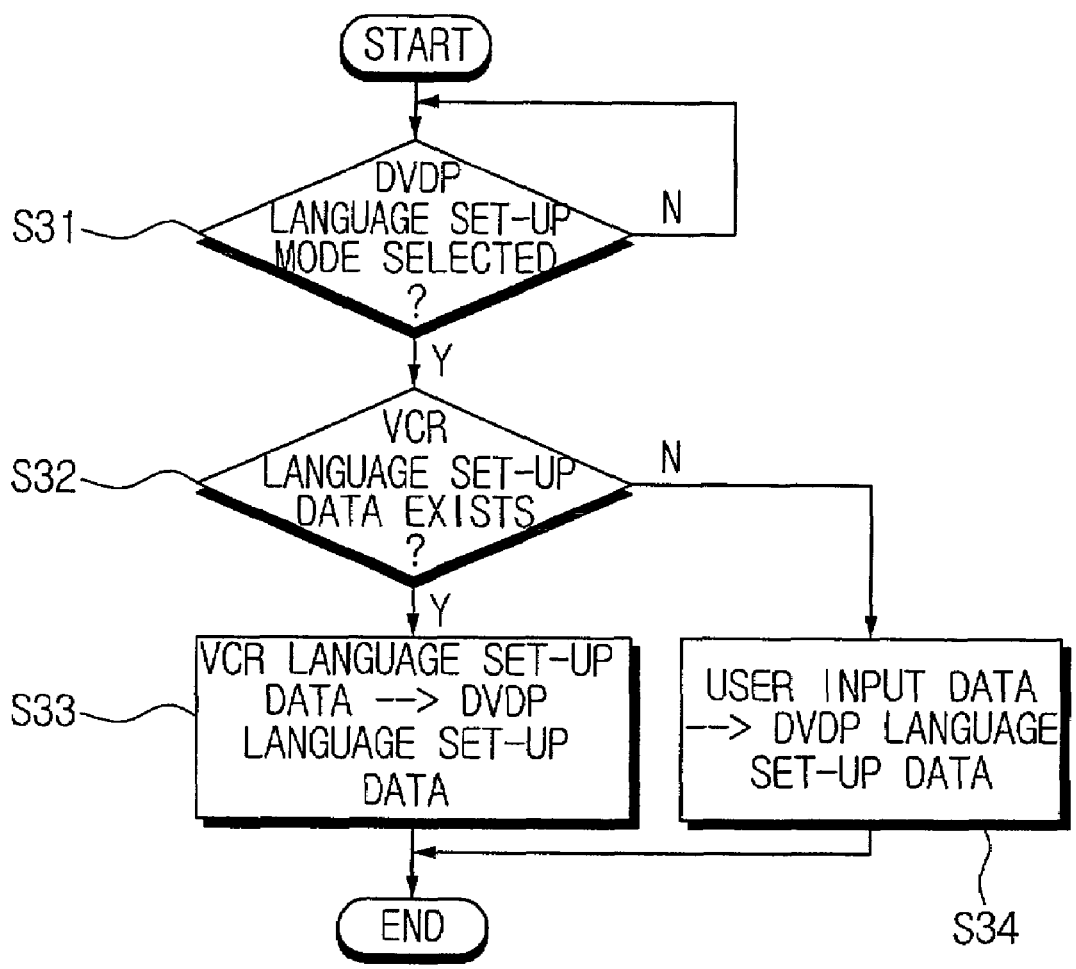
FIGS. 3 and 4 are flow charts illustrating the operations of setting up a value performed by the combination system in FIG. 2.

FIG. 3 is flow chart illustrating the operations of setting up the set-up value of the combination system according to the present invention. More particularly, FIG. 3 is a flow chart illustrating the operations of setting up the set-up value when the user sets up the data with regard to the language to the DVDP unit 120 in the DVDP/VCR combination system 100.

When the user selects the operation of setting up the set-up value in the DVDP unit 120, the OSD block 160 outputs set-up value setting menus, and displays the set-up value setting menus on the TV screen. When the user selects a language set-up mode among the set-up value setting menus output on the TV screen by manipulating the remote controller 180 (S31), a language set-up mode selection signal is transmitted to the VCR controller 114 through the remote control sensor 118.

The VCR controller 114 judges whether set-up value data about the language exists among the set-up value data stored in the VCR set-up value storage unit 115 (S32). When the data about the language exists, the VCR controller 114 transmits the data to the DVD controller 123, then the DVD controller 123 stores the received data into the DVD set-up value storage unit 125 (S33). Accordingly, the set-up value data about the language pre-set up in the VCR unit 110 is stored as the set-up value data of the DVDP unit 120.

When there is no set-up value data about the language in the VCR set-up value storage unit 115, the VCR controller 114 waits for the user to input the set-up value about the language. When the user inputs the data, then the VCR controller 114 transmits the input data to the DVD controller 123. At this time, the data input by the user is performed using the OSD operation on the TV screen. In other words, when there is no set-up value data about the language, the OSD block 160 outputs a language selection screen as illustrated in FIG. 6, and the screen is displayed on the TV. The user can select one language among languages provided by the language selection screen by using a cursor movement key and an enter key as described at the right side of the selection screen. When the user selects a special language by using the remote controller 180, the selection of the user is transmitted to the VCR controller 114. The DVD controller 123 inputs the user input data transmitted from the VCR controller 114 into the DVD set-up value storage unit 125 (S34), and by doing so, a language set-up in the DVDP unit 120 is completed.

When the DVDP unit 120 performs a reproducing operation, the DVDP unit 120 refers to the language data stored in the set-up value storage unit 125 of the DVDP unit 120. Then, the sound data corresponding to the referred language is output. Furthermore, sometimes subtitle data corresponding to the referred language is displayed. Accordingly, the user can enjoy the image and the sound output with the language set-up by him/herself.

In addition, when the user controls various operations of the DVDP unit 120 or sets up a new set-up value by using the remote controller 180, the OSD block 160 outputs screens required to input the various operations illustrated in FIGS. 7 through 10. Therefore, the user can refer to various menu screens provided in English by manipulating the remote controller 180, and can input various commands by using the same.

Figure 4:
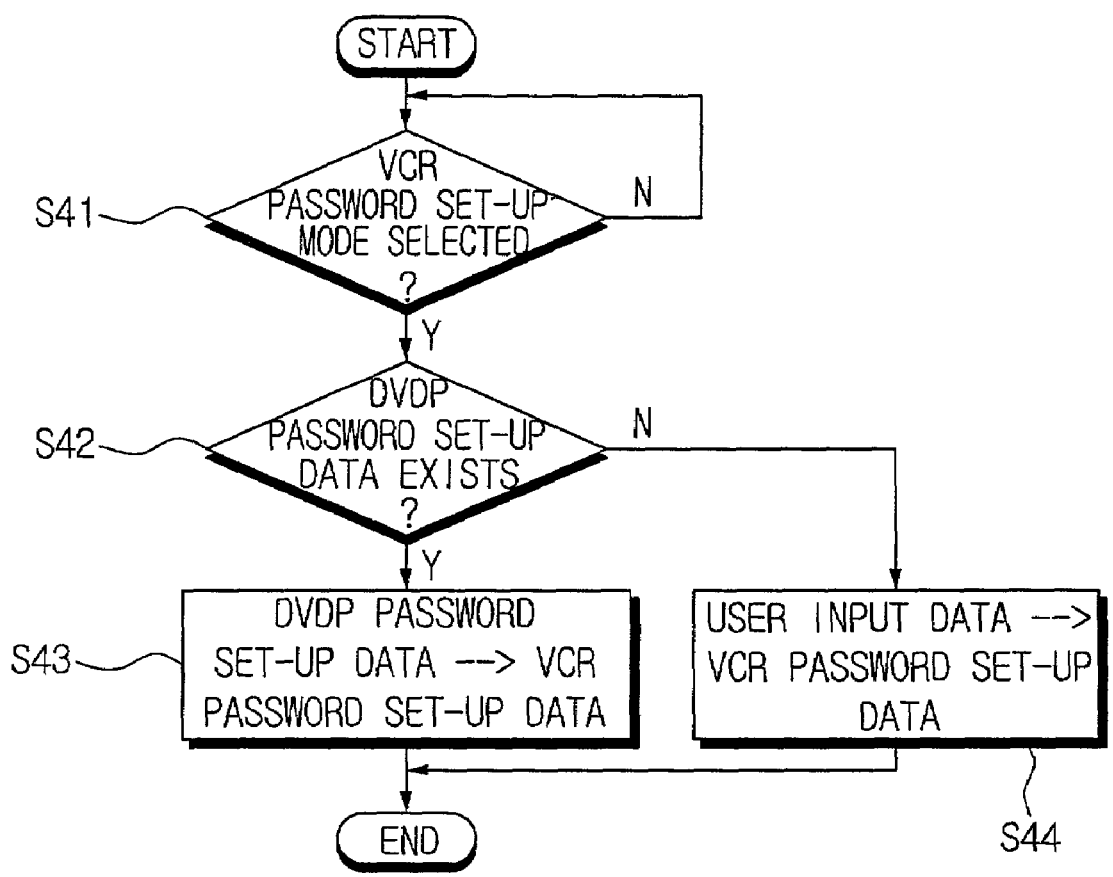

FIG. 4 illustrates another embodiment of the present invention. FIG. 4 is a flow chart illustrating the operations of setting up when the user sets up the data about the password in the VCR unit 110 of the DVDP/VCR combination system 100.

When the user selects the operation of setting up the set-up value in the VCR unit 110, the OSD block 160 outputs the set-up menus and displays the set-up menus on the TV screen. When the user selects a password set-up mode among the set-up menus output on the TV screen by manipulating the remote controller 180 (S41), a password set-up mode selection signal is transmitted to the VCR controller 114 through the remote control sensor 118. The VCR controller 114 transmits the password set-up mode selection signal to the DVD controller 123.

The DVD controller 123 judges whether the set-up value data about the password exists among the set-up value data stored in the DVD set-up value storage unit 125 (S42). When the set-up value data about the password exists, the DVD controller 123 transmits the data to the VCR controller 114, then the VCR controller 114 stores the received data into the VCR set-up value storage unit 115 (S43). Accordingly, the set-up value data with regard to a password pre-set up in the DVDP unit 120 is stored as the set-up value data of the VCR unit 110.

When there is no set-up value data about the password in the DVD set-up value storage unit 125, the DVD controller 123 transmits the non-existence of the data to the VCR controller 114. The VCR controller 114 displays the menu screen to the user by controlling the OSD block 160. The VCR controller 114 waits for the user to input the set-up value data about the password in the status that the menu screen is displayed. When the user inputs the password data by manipulating the remote controller 180, the input data is input into the VCR set-up value storage unit 115 by the VCR controller 114 (S34). Accordingly, by doing so, a password set-up of the VCR unit 110 is completed.

The VCR unit 110 and the DVDP unit 120 can have an operation to request an input of the password before inputting the control signal to perform an operation. At this time, when the user inputs the password, the VCR unit 110 and the DVDP unit 120 judge whether the password data stored in the set-up value storage units 115 and 125 is the same as the input password. Then, only when the input password is the same as the stored password data, the VCR unit 110 and the DVDP unit 120 perform the operation corresponding to the input command that the user has input by using the remote controller 180.

Figure 11:
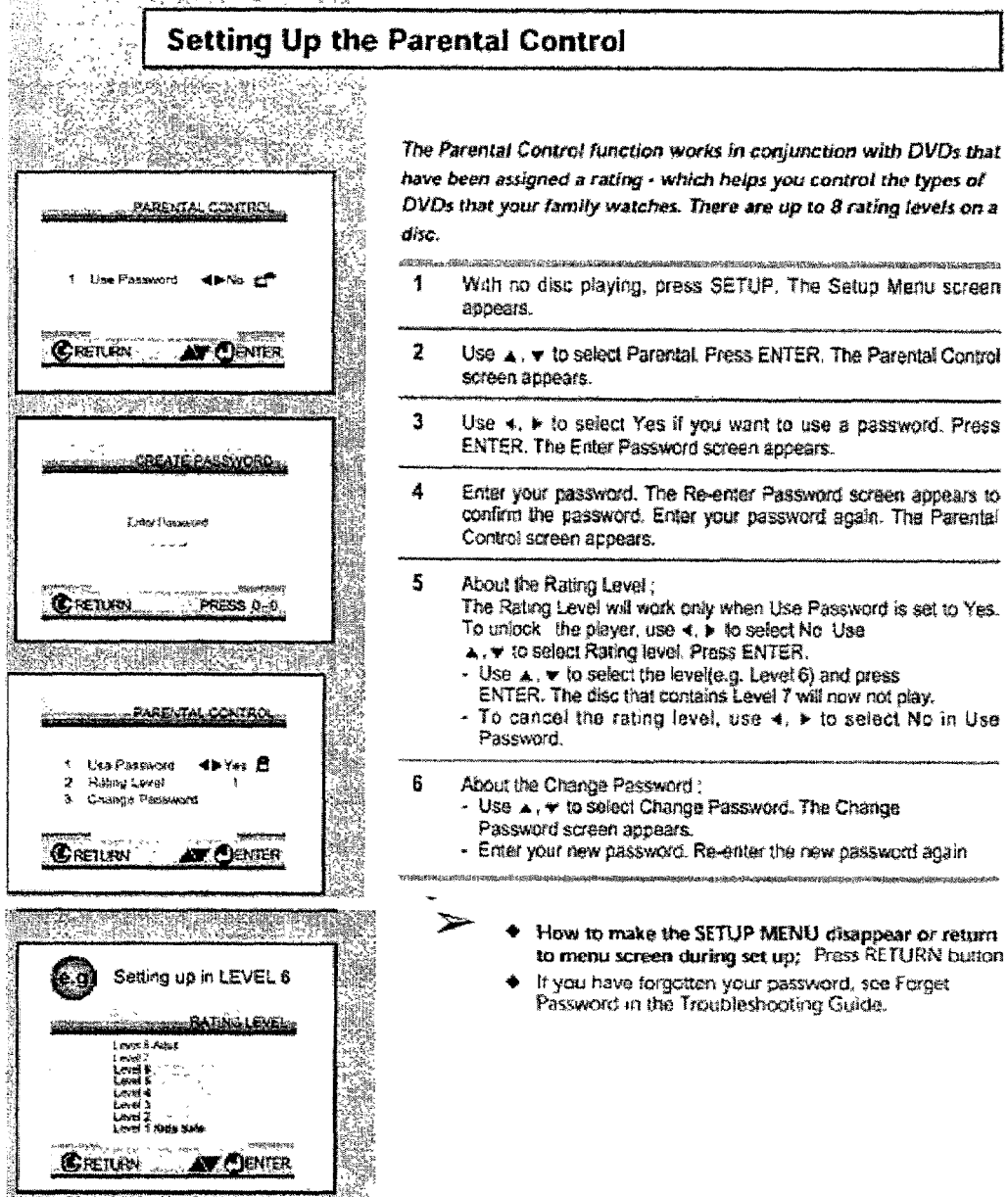
FIG. 11 is a view illustrating one example of the OSD screen when a set up password is used for parent control of a DVDP unit according to an embodiment of the present invention.

Moreover, the DVDP unit 120 can use the above password as a password to watch a special program or a special scene. In other words, the password can be used as a parent control. FIG. 11 illustrates an example of an OSD screen provided for the user to perform operations such as the input and the change of the password for parent control.

As described above, since the DVD controller 123 and the VCR controller 114 input the set-up value data into the DVD set-up value storage unit 125 and the VCR set-up value storage unit 115 by transferring the set-up value data to each other, the user can allow the DVDP unit 120 and the VCR unit 110 to use the common set-up value data. Therefore, the user can set up the value of the DVDP unit 120 and the VCR unit 110 by setting up the value only once.

An embodiment of the present invention provides that the above set-up operation can be performed only when the set-up value input by the user is commonly needed for the DVDP unit 120 and the VCR unit 110. For example, when the DVDP unit 120 does not provide the operation of recording the data input from the outside on the DVD, and the VCR unit 110 provides the operation of recording the data input from the outside on the magnetic tape, the set-up value for a record mode of the data is not the set-up value commonly needed by the DVDP unit 120 and the VCR unit 110. Accordingly, when the user inputs the set-up value with respect to the record mode, it can be set up that the process for commonly using the set-up value is not performed but the data is input only into the VCR set-up value storage unit 115. Thus, undesired data can be prevented from being used commonly by allowing only the data needed commonly for the DVDP unit 120 and the VCR unit 110 to be transferred to each other.

Furthermore, only when the user inputs a command to allow the DVDP unit 120 and the VCR unit 110 to commonly use the set-up value through the remote controller 180 or the manipulation panel 110, it can be set up that the set-up value pre-stored in the DVD set-up value storage unit 125 and the VCR set-up value storage unit 115 is commonly used through the above process. Accordingly, it is preferable that an operation to judge the input of the command for common use of the set-up value is further performed between the step of S32 (or S42) and the step of S33 (or S43). In other words, when a set-up value data which the user desires to set up is the same as that of the set-up value which already exists (S32 or S42), a menu to input whether the user desires to commonly use the set-up value is provided by using the OSD operation. When the user selects the common use of the set-up value through the menu, operation S33 (or S43) is performed. When the user selects not to commonly use the set-up value, then the step S34 (or S44) can be set up to be selected.

Figure 5:
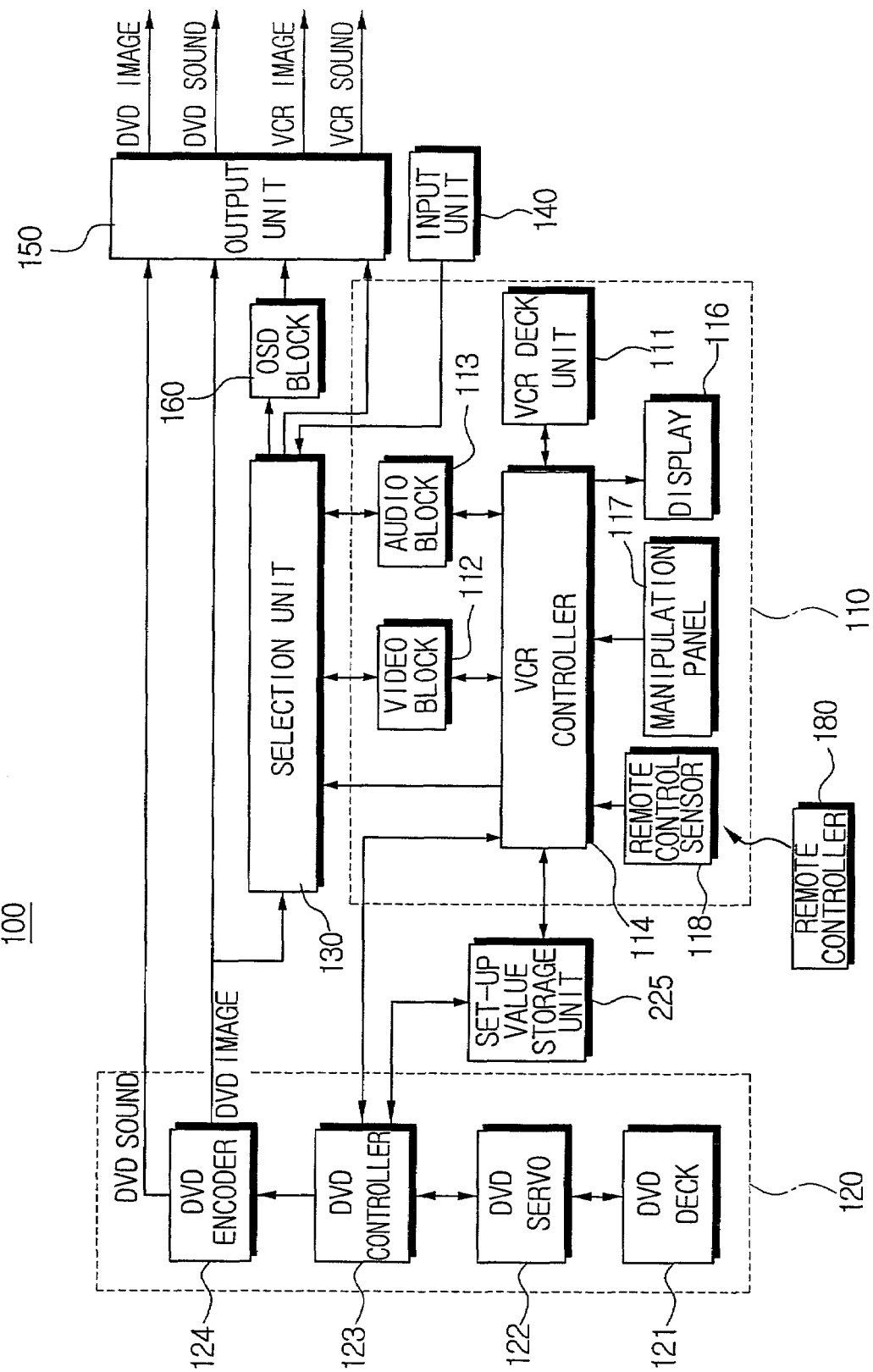
FIG. 5 is a view illustrating a block diagram of a DVDP/VCR combination system according to another embodiment of the present invention
Figure 7:
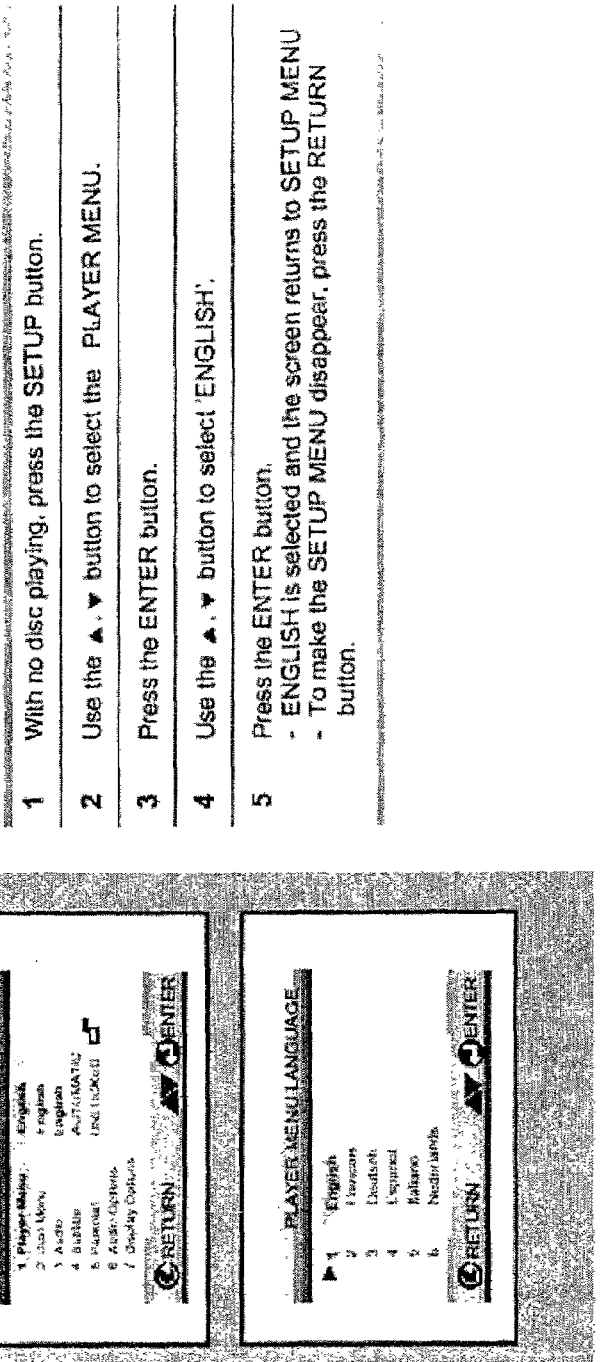
Figure 8:
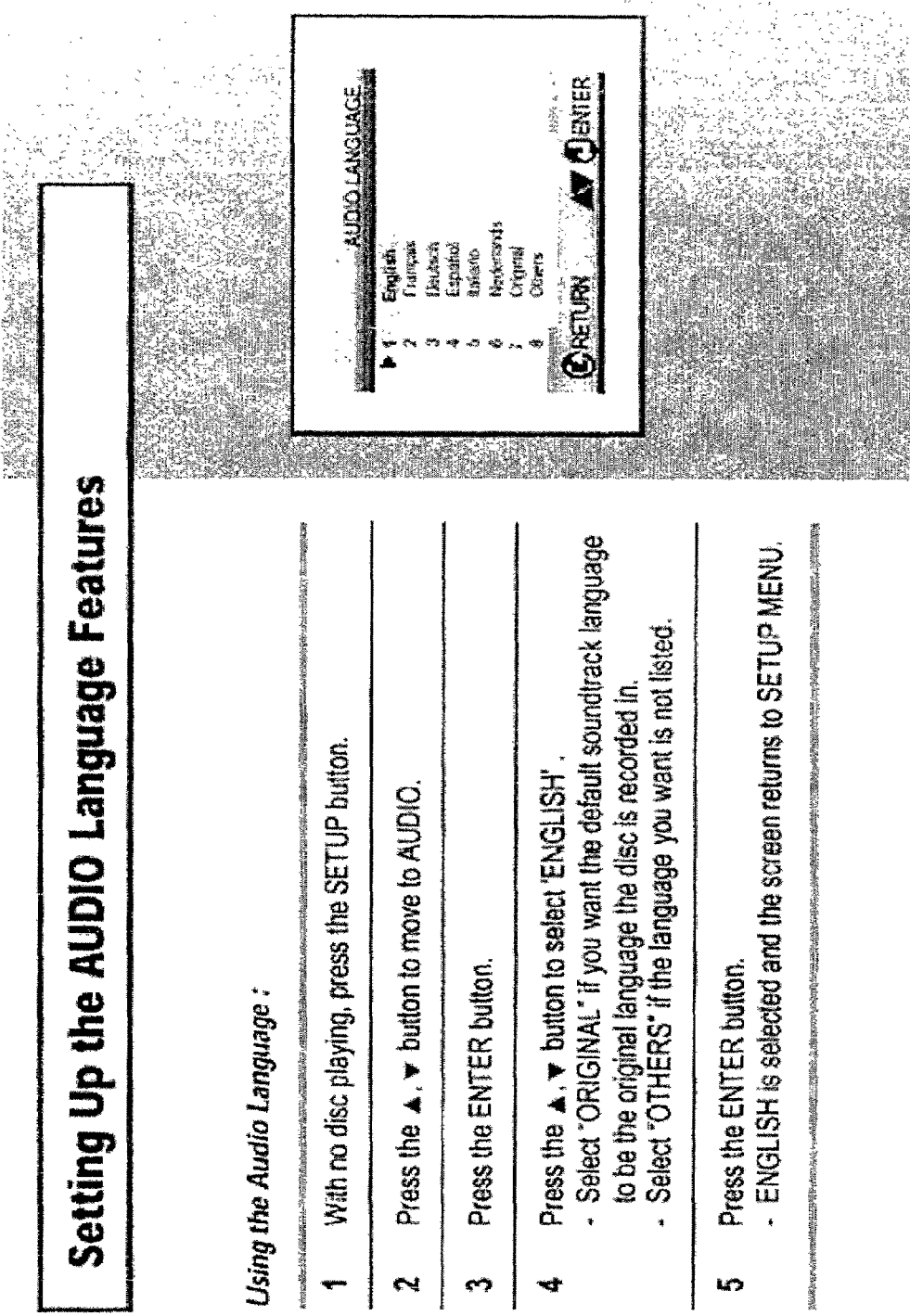

FIG. 5 is a view illustrating another embodiment of the present invention. In this embodiment, the same reference numerals have been given to the same parts illustrated in FIG. 2, and therefore a detailed description for these parts will be omitted.

In the embodiment of FIG. 5, a DVDP/VCR combination system 100 having one set-up value storage unit 225 is provided. Therefore, the set-up value data input through the remote controller 180 or the manipulation panel 117 is input into the set-up value storage unit 225 through the VCR controller 114. The set-up value data is input into the set-up value storage unit 225 by the VCR controller 114 regardless of a fact that the current operation mode of the combo system 100 is the DVDP mode or the VCR mode. When the user selects the value set-up mode, the OSD block 160 provides the value set-up menus having a list of all set-up values needed for the operation of the DVDP unit 120 and the VCR unit 110.

When the DVDP unit 120 and the VCR unit 110 operate, the DVD controller 123 and the VCR controller 114 read the set-up value needed to operate the DVDP unit 120 and the VCR unit 110 from the set-up value storage unit 225. Thus, the DVDP unit 120 and the VCR unit 110 commonly use the set-up values set up in one set-up value storage unit 225.

According to the present invention, since each of the devices commonly use the set-up value input by the user, the user does not have to input the set-up value individually with regard to each of the devices.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A combination system in which a plurality of devices to perform independent operations are combined therein, comprising:
    an input unit to input a set-up value representing data about an operation mode of said plurality of devices;
    a plurality of set-up value storage units respectively disposed in each of said plurality of devices, said plurality of set-up value storage units used to store data about the set-up value; and
    a controller to control said set-up value storage units so that an existing set-up value stored in one of said set-up value storage units is stored in another of said set-up value storage units when data input to said another of said set-up value storage units through said input unit is a same type of data as the existing set-up value stored in said one of said set-up value storage units,
    wherein the one of said set-up value storage units is in a different one of said plurality of devices than the another of said set-up value storage units;
    wherein said controller controls said plurality of set-up value storage units so that the existing set-up value is stored in said another of the set-up value storage units when a command for common use of the set-up value is input through the input unit; and
    wherein one of said plurality of devices is a VCR unit and another of said plurality of devices is a DVDP unit.

2. The combination system according to claim 1, wherein said existing set-up value data stored in one of said set-up value storage units includes data about a language to be used.

3. The combination system according to claim 1, wherein said existing set-up value data stored in one of said set-up value storage units includes data about a password to be used.

4. A combination system in which a plurality of devices to perform independent functions are combined therein, comprising:
- a plurality of set-up value storage units, respectively disposed in each of said plurality of devices, said plurality of set-up value storage units used to store data about the set-up value of each of said plurality of devices; and
- a controller to control each of said set-up value storage units to store a set-up value pre-stored in one of said set-up value storage units into another of said set-up value storage units,
- wherein the one of said set-up value storage units is in a different one of said plurality of devices than the another of said set-up value storage units;
- wherein the controller controls said set-up value storage units to store the set-up value stored in said one of said set-up value storage units into said another of said set-up value storage units when the set-up value is data commonly required for each of said plurality of devices; and
- wherein one of said plurality of devices is a VCR unit and another of said plurality of devices is a DVDP unit.

5. The combination system according to claim 4, further comprising an input unit to input the set-up value into at least one of the set-up value storage units,
- wherein the controller controls said set-up value storage units to store the pre-stored set-up value into said one of said set-up storage units which is a set-up target storage unit when data about the set-up value input through the input unit is pre-stored in another of the set-up value storage units.

6. The combination system according to claim 5, wherein the controller controls the set-up value storage units to store the pre-stored set-up value into said one of said set-up value storage units which is a set-up target storage unit when a user inputs a command for common use of the set-up value through said input unit.

7. A combination system, comprising:
- a plurality of devices to perform independent operations;
- an input unit to input a set-up value with regard to said plurality of devices; and
- a set-up value storage unit to store the set-up value input through said input unit,
- wherein each of said plurality of devices commonly has the set-up value stored in the set-up value storage unit and performs individual operations thereof based on the set-up value,
- wherein one of said plurality of devices is a VCR unit and the another of said plurality of devices is a DVDP unit.

8. The combination system according to claim 7, wherein said set-up value storing unit is external to both said VCR unit and said DVDP unit.

9. A method of setting up a combination system in which a plurality of devices to perform independent operations are combined therein, comprising:
- judging whether a set-up value input into at least one of said plurality of devices is a same type of value as a pre-stored set-up value with regard to another device among said plurality of devices; and
- setting up the pre-stored set-up value as a common set-up value of said plurality of devices when the input set-up value and the pre-stored set-up value are judged to be the same type during said judging,
- wherein one of said plurality of devices is a VCR unit and the another of said plurality of devices is a DVDP unit.

10. The method of setting up a combination system according to claim 9, further comprising setting up one of the plurality of devices as a set-up target device with the input set-up value when judged as a different type of value during the judging.

11. A method of operating a combination system including a DVDP and a VCR when an operation to set up set-up values in the DVDP is selected, the method comprising:
- displaying set-up value setting menus including language set-up modes on a screen;
- transmitting a language set-up mode selection signal to the VCR when a language set-up mode among the set-up value setting menus is selected;
- judging whether set-up value data about the language exists among set-up value data stored in the VCR, and if the set-up value data about the language exists in the VCR, then transmitting the set-up value data from the VCR to the DVDP and storing the set-up value data therein, otherwise wait for set-up value about the language to be input into the combination system and then transmitting the input set-up value data from the VCR to the DVDP.

12. The method of operating a combination system according to claim 11, wherein the displaying is performed by an OSD block.

13. The method of operating a combination system according to claim 12, wherein the transmitting a language set-up mode selection signal is transmitted to a VCR controller through a remote control sensor.

14. The method of operating a combination system according to claim 13, wherein the judging is performed by the VCR controller.

15. A method of setting up a DVDP/VCR combination system when an operation to set up data about a password in the VCR unit is selected, the method comprising:
- outputting set-up menus including password set-up modes on a screen;
- transmitting a password set-up mode selection signal to the VCR;
- transmitting the password set-up mode selection signal to the DVDP;
- judging whether the set-up value data about the password exists among set-up value data stored in the DVDP, and if the set-up value data about the password exists, transmitting the data to the VCR, otherwise transmitting the non-existence of the data to the VCR, waiting for the set-up value data about the password to be input, and then inputting the input data about the password to the VCR.

16. The method of setting up a DVDP/VCR combination system according to claim 15, wherein the outputting is performed by an OSD block.

17. The method of setting up a DVDP/VCR combination system according to claim 15, wherein the transmitting a password set-up mode selection signal to the VCR is transmitted to a VCR controller through a remote control sensor.

18. The method of setting up a DVDP/VCR combination system according to claim 15, wherein the transmitting a password set-up mode selection signal to the DVDP is performed by the VCR controller.

19. The method of setting up a DVDP/VCR combination system according to claim 15, wherein the judging is performed by a DVDP controller.

20. The method of setting up a DVDP/VCR combination system according to claim 15, wherein input of the password is requested before permitting input data to perform an operation.

21. A combination VCR/DVDP system comprising:
a VCR unit having a first set-up mode storing unit to store data about set-up values of said VCR unit;
a DVDP unit having a second set-up mode storing unit to store data about set-up values of said DVDP unit;
an input unit to input set-up values representative of operation modes of said DVD unit and said VCR unit; and
a controller to reciprocally transmit the set-up value data such that said DVD unit and said VCR unit can commonly use the input set-up values such that a set-up value of said DVDP unit and the set-up value of said VCR unit are set up only once.

22. The combination VCR/DVDP system according to claim 21, wherein the set-up operation is performed only when the set-up value input is commonly needed for said DVDP unit and said VCR unit.

23. The combination VCR/DVDP system according to claim 21, wherein the set-up operation is performed only when a command to allow said DVDP unit and said VCR unit to commonly use the set-up value is input through said input unit.

24. The combination VCR/DVDP system according to claim 21, wherein said first and second set-up mode storing units are non-volatile memory storing units.

* * * * *